United States Patent [19]

Brown et al.

[11] Patent Number: 5,142,366
[45] Date of Patent: Aug. 25, 1992

[54] VIDEO-SYNC LOCKED HORIZONTAL SIZE REGULATION IN PROJECTION LIGHT VALVE SYSTEM

[75] Inventors: David W. Brown, Fulton; Terrence E. Rogers, Clay, both of N.Y.

[73] Assignee: General Electric Company, Syracuse, N.Y.

[21] Appl. No.: 629,534

[22] Filed: Dec. 18, 1990

[51] Int. Cl.$^5$ .............................................. H04N 5/74
[52] U.S. Cl. ....................................... 358/180; 358/231
[58] Field of Search ................. 358/180, 158, 159, 60, 358/231, 232, 235, 236; 340/731, 812, 813, 814; 315/379

[56] References Cited

U.S. PATENT DOCUMENTS

| | | | |
|---|---|---|---|
| 4,085,425 | 4/1978 | Hamill | 358/237 |
| 4,672,449 | 6/1987 | Kraus et al. | 340/814 X |
| 4,763,194 | 8/1988 | Osman | 358/180 |
| 4,864,405 | 9/1989 | Chambers | 358/180 |
| 4,958,227 | 9/1990 | Wan | 340/814 X |
| 4,958,228 | 9/1990 | Kutsuki et al. | 358/158 |
| 5,008,659 | 4/1991 | Hovens | 358/159 X |
| 5,043,813 | 8/1991 | Christopher | 358/159 X |

Primary Examiner—James J. Groody
Assistant Examiner—Mark R. Powell
Attorney, Agent, or Firm—Paul Checkovich; Geoffrey H. Krauss

[57] ABSTRACT

The horizontal size of the raster in a light valve projection system is determined by the ratio by which a RF carrier is divided, wherein the frequency of the RF carrier is locked to a synchronization signal derived from the horizontal synchronization pulses of an externally-supplied video signal to be displayed.

20 Claims, 2 Drawing Sheets

VIDEO-SYNC LOCKED HORIZONTAL SIZE REGULATION IN PROJECTION LIGHT VALVE SYSTEM

FIELD OF THE INVENTION

The present invention relates to light valve projection systems and, more particularly, to a novel method of, and apparatus for, establishing a light valve projection system raster with horizontal size regulated by characteristics of the externally-supplied video signal to be displayed.

BACKGROUND OF THE INVENTION

It is now well known to use a projection light valve system for display of an externally-supplied video signal. There is a problem, however, when a plurality of light valve projectors are utilized to provide overlapping rasters which must be exactly the same horizontal size. In such instances (such as in flight simulators and the like apparatus), easily observable raster size errors can be caused by any error in the relative size of the two overlapped rasters. Accordingly, it is highly desirable to provide a method of, and apparatus for, setting the horizontal size of a light valve projection raster to a desired value and, once set to a desired value, to be maintained.

In some light valve projection systems, the horizontal size of the projection raster may have been established by the frequency of a crystal oscillator. Since crystal oscillators with a high degree of frequency stability can be provided, a similar high degree of horizontal size stability is also obtained.

There is another problem, however, with using crystal oscillator, inasmuch as the color determining, or reference, RF oscillator may be free running, which may result in some frequency drift, with attendent color drift. Accordingly, it is also highly desirable to maintain both the color RF oscillator and the raster size responsive to synchronization provided as part of the externally-supplied video signal to be displayed.

SUMMARY OF THE INVENTION

In accordance with the present invention, the horizontal size of the raster in a light valve projection system is determined by the division ratio by which a RF carrier is divided, where the carrier frequency is locked to a synchronization signal derived from the horizontal synchronization pulses of an externally-supplied video signal to be displayed. The RF oscillator is keyed on at the end of each sync pulse, and a phase-locked loop (PLL) sets the RF carrier frequency such that, after division by a settable divisor, the divided-down frequency is locked to the frequency of the sync signal. The raster sweep is sampled at a pair of points with timing established responsive to the RF carrier, and therefore to the sync signal, to maintain exactly the required size. Size can be changed by varying the division ratio.

In one presently preferred embodiment, a keyed phase-locked loop locks the RF carrier frequency of a voltage-controlled oscillator to the interpulse time intervals of the externally-supplied video horizontal synchronization waveform, and digital information from a system microprocessor is utilized to set the RF carrier frequency relative to the horizontal sync waveform, which then will set the time interval between first and second horizontal sampling signals, each determining when one of a pair of voltage sampling signals, respectively at the beginning and near the center of the raster horizontal sweep, are taken. A change in digital data from the microprocessor effects a small change in RF frequency which in turn effects a small change in raster horizontal size for each bit of change in digital information supplied to a programmable counter.

Accordingly, it is an object of the present invention to provide a novel method of, and apparatus for, controlling the horizontal size of the raster in a light valve projection system responsive to the synchronization characteristics of externally-supplied video to be displayed.

This and other objects of the present invention will become apparent to those skilled in the art upon reading of the following detailed description of the invention, when considered in conjunction with the associated drawings.

DETAILED DESCRIPTION OF A PRESENTLY PREFERRED EMBODIMENT OF THE INVENTION

Figure 1:
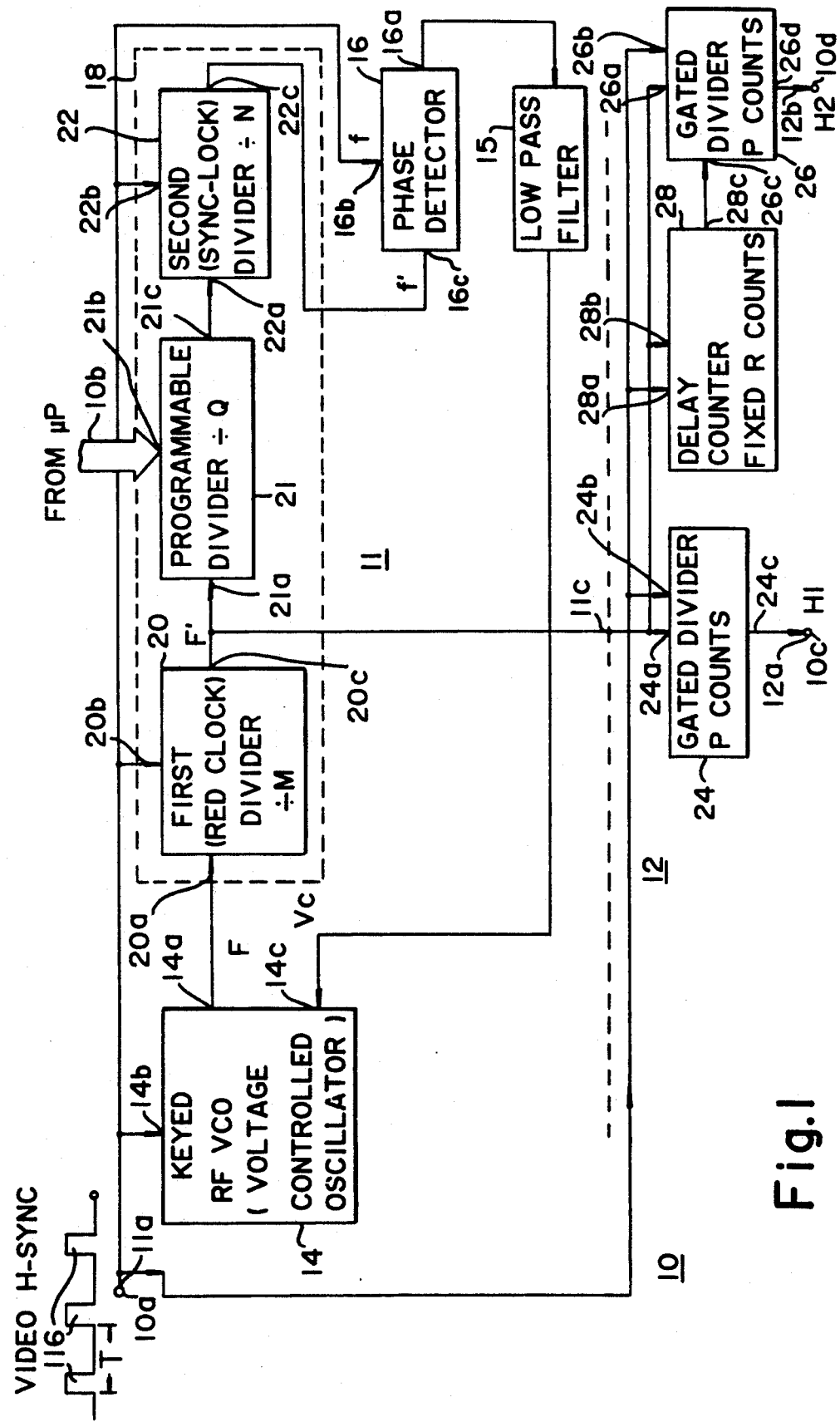
FIG. 1 is a schematic block diagram of a sync-lock horizontal size regulator for a light valve projector.
Figure 2:
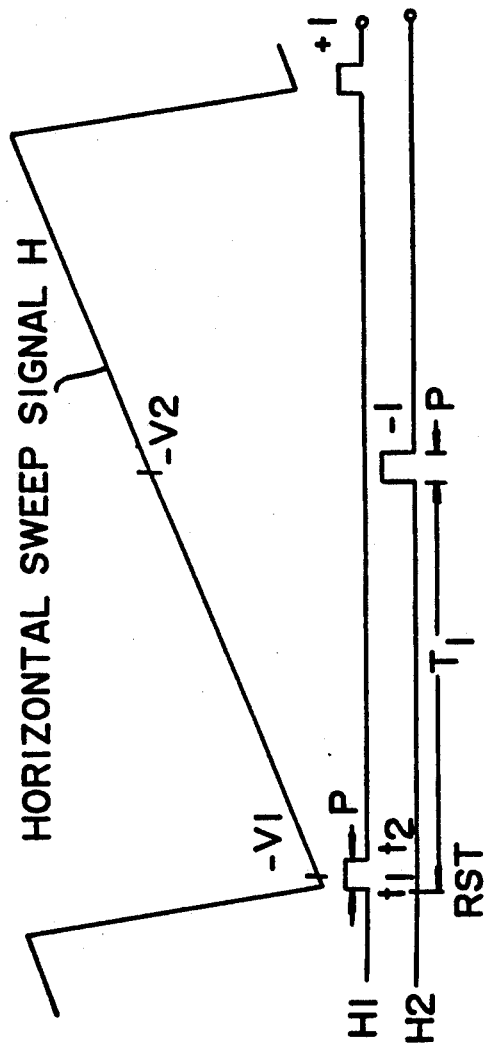
FIG. 2 is a set of time-related sweep and sampling signal waveforms provided by use of the circuit of FIG. 1.

Referring to the Figures, a horizontal size regulator 10 for use in a light valve projector, includes a phase-locked loop portion 11 providing an RF carrier of frequency F which is locked to a reciprocal of a interpulse time interval T between adjacent pulses of a periodic pulse train provided to a first input 10a; the sequential pulses 11b of the train are directly or indirectly obtained from the externally-provided video signal to be displayed. In the illustrated embodiment, the periodic signal is a horizontal synchronization signal, which may be derived (in apparatus not shown, but well-known to the art) from the horizontal flyback circuitry in the projection system deflection section, and having a frequency $f=1/T$ set by the horizontal synchronization pulses of the externally-supplied video signal. For example, if a NTSC video signal is provided (for display of a RGB color signal in accordance with the current US color television standard) f is approximately 15.75 KHz., and T is approximately 63.5 microseconds. This signal is applied at a PLL section control input 11a and, responsive to size-selection data at a data port 10b (from a microprocessor forming a part of the projector), is used to regulate the relative times, after the start of each horizontal sweep, at which sampling signals H1 and H2 appear at first and second outputs 12a and 12b of a horizontal size pulse generation portion 12.

A RF carrier is generated at the output 14a of a voltage-control oscillator means 14, whenever the sync signal applied at input 14b is low; the carrier frequency F is controlled responsive to voltage $V_c$ at a control input 14b. The control voltage is provided from a low-pass filter 15, acting upon the voltage at an output 16a of a phase detector means 16, such as the well-known 4046 type integrated circuit phase/frequency detector. The voltage at output 16a is a function of the timing of pulses appearing at a first input 16b, relative to the timing of other pulses appearing at a second input 16c, and acts in a manner well-known to the frequency control arts. The first, or reference, signal waveform at input 16b is the horizontal synchronization waveform provided at input 11a. The keyed oscillator output signal frequency F is divided by a digital divider means 18. Means 18 includes a first divider means 20, which may be utilized to establish the signal for a first component, e.g., the red clock, of the raster, by dividing the VCO means carrier frequency F by a first division integer M. Thus, the carrier signal is applied to a first divider first input 20a and a reset RST signal (which is the horizontal-synchronization pulse train at input 11a) is applied at a second input 20b, to provide, at first divider output 20c, a train of pulses which cease during each of the horizontal synchronization pulse intervals 11b and, once pulses 11b fall substantially to the zero level, are provided at output 20c at a frequency F/M. If the carrier frequency F is about 144 MHz. and the first divider ratio M=9, the pulse train at output 20c after the sync pulses 11b have fallen to the substantially zero level, is at about 16 megapulses per second. This pulse train is provided to a PLL section output 11c and to a clock input 21a of a programmable divider (÷Q) means 21, having its division ratio Q set responsive to data provided at a port 21b. The output 21c of this means is coupled to a first input 22a of a second (or sync-lock) divider means 22. A second input 22b of the second divider means receives the video horizontal sync pulses 11b. The division ratio N of the second divider means 22 is chosen such that the digital pulse train at that divider means output 22c is at a frequency $f^1$ which will be approximately at the horizontal synchronization frequency f, e.g. N of about 1018, even if the loop is not locked. Any deviation of the frequency $f^1 = F/MQN$ at the output 22c of the second divider means, with respect to the frequency f of the video-supplied synchronization pulses 11b, is detected and fed back to correct the frequency of VCO means 14, in manner so as to cause frequency $F^1$ to set, and lock, to some multiple of the incoming synchronization frequency. Thus, the carrier frequency from which the horizontal size of the raster is generated is regulated and stabilized by locking to the externally-supplied synchronization signals. It should be understood that other partitioning of the means 18 block can be used, as long as some programmable divisor properties are present.

Means 12 includes first and second fixed-count gated pulser means 24 and 26, and a fixed-count delay divider means 28. All of the means 24/26/28 receive the RF carrier at frequency $F^1 = F/M$ at first inputs 24a/26a/28a and the sync pulses 11b at second inputs 24b/26b/28b. The output of gated divider 24 is set to a zero level unless one of pulses 11b is at a non-zero level. The first horizontal sampling H1 output signal, provided to output 12a from the output 24c of divider 24, thus commences its non-zero level at a time $t_{Q1}$ at the beginning of a first horizontal synchronization pulse (when pulse 11b rises to the logic 1 level) when the output 24c is set by the signal at input 24b, and exists at this high logic level until a time $t_2$ when means 24 has counted a fixed number P of pulses (e.g. P=16 pulses) of the carrier $F^1$ signal at input 24a. At the end of the required number of counts, the H1 signal falls back to the zero logic level, until the next reset signal at the beginning o f the next synchronization pulse 11b.

Counter means 28 begins to count pulses of the carrier $F^1$ signal, at its input 28a, from the beginning of each sync pulse 11b, and enables its output 28c only when a fixed number R of $F^1$ divided-down carrier pulses have been counted. This delayed signal is applied to another input 26a of the second P-count gated divider counter 26. Thus, at a time $T_1$ after the leading edge of each sync pulse 11b (where $T_1$ is the time interval for counting R pulses of the $F^1$ carrier frequency), the output 26d of counter means 26 is enabled for a time interval set by the desired number (e.g. P=16) of pulses; this H2 sample pulse occurs generally in the latter half of the sweep time interval. The horizontal sweep signal waveform H is thus sampled during the first and second sampling pulses H1 and H2, and the associated voltages V1 and V2 are processed to regulate the horizontal sweep ramp and therefore the horizontal raster size.

While one presently preferred embodiment of our novel method of, and apparatus for, establishing the horizontal size of the raster in a light valve projection system by locking a raster-setting RF carrier frequency to synchronization characteristics of an externally-provided video signal, has been described in some detail herein, many variations and modifications will now become apparent to those skilled in the art. It is our intent, therefore, to be limited only by the scope of the appending claims, and not by the specific details and instrumentalities presented by way of description of the embodiment described herein.

What is claimed is:

1. A method for establishing a horizontal size of a display raster in a light valve projection system, comprising the steps of:
   (a) receiving a sequence of synchronization pulses responsive to a video signal to be displayed;
   (b) locking a divided-down RF carrier frequency to the frequency of video signal synchronization pulses;
   (c) raster sweep waveform within a first fixed number of divided-down carrier frequency cycles after each synchronization pulse;
   (d) generating a second signal sampling the sweep waveform within a second fixed number of divided-down carrier frequency cycles after a known number of counts of delay after each synchronization pulse; and
   (e) using the first and second signals to adjust the sweep waveform to attain a display raster of essentially constant horizontal size.

2. The method of claim 1, further comprising the step of adjusting the divided-down RF carrier frequency by changing the ratio of division of the frequency of an initial RF carrier, relative to the frequency of the synchronization pulses, to adjust horizontal raster size.

3. The method of claim 2, wherein the ratio adjusting step is carried out under control of a microprocessor.

4. The method of claim 3, wherein the ratio adjusting step includes the step of dividing the RF frequency in a first divider by a first divisor M to obtain the divided-down carrier frequency cycles to be used to generate the first and second signals.

5. The method of claim 4, wherein step (b) includes the step of programmably dividing the output of the first divider of a selected divisor Q.

6. The method of claim 5, wherein step (b) further includes the step of dividing the programmably-divided frequency by a second divisor N to obtain a first signal with a frequency approximately equal to the frequency of the sequential synchronization pulses.

7. The method of claim 2, wherein the ratio adjusting step includes the step of dividing the RF frequency in a first divider by a first divisor M to obtain the divided-down carrier frequency cycles to be used to generate the first and second signals.

8. The method of claim 7, wherein step (b) includes the step of programmably dividing the output of the first divider by a selected divisor Q.

9. The method of claim 8, wherein step (b) further includes the step of dividing the programmably-divided frequency by a second divisor N to obtain a first signal with a frequency approximately equal to the frequency of the synchronization pulses.

10. The method of claim 1, wherein step (d) includes the step of separately counting a selected number R of divided-down carrier frequency cycles after each synchronization pulse, before enabling the second sweep waveform sampling signal.

11. Apparatus for establishing a horizontal size of a display raster in a light valve projection system, comprising:
    means for receiving a sequence of synchronization pulses responsive to a video signal to be displayed;
    means for locking a divided-down RF carrier frequency to the frequency of video signal synchronization pulses;
    means for generating a first signal sampling a raster sweep waveform within a first fixed number of divided-down carrier frequency cycles after each synchronization pulse;
    means for generating a second signal sampling the sweep waveform within a second fixed number of divided-down carrier frequency cycles after a known number of counts of delay after each synchronization pulse; and
    means for utilizing the first and second signals to adjust the sweep waveform to attain a display raster of essentially constant horizontal size.

12. The apparatus of claim 11, further comprising means for adjusting the divided-down RF carrier frequency by changing the ratio of division of the frequency of an initial RF carrier, relative to the frequency of the synchronization, pulses to establish horizontal raster size.

13. The apparatus of claim 12, wherein the ratio adjusting means is under control of a microprocessor.

14. The apparatus of claim 13, wherein the ratio adjusting means includes means for dividing the RF frequency by a first divisor M to obtain the divided-down carrier frequency cycles to be used to generate the first and second signals.

15. The apparatus of claim 1, wherein the adjusting means includes means for programmably dividing the output of the first divider by a selected divisor Q.

16. The apparatus of claim 15, wherein the adjusting means includes means for dividing the programmably-divided frequency by a second divisor N to obtain a first signal with a frequency approximately equal to the frequency of the sequential synchronization pulses.

17. The apparatus of claim 12, wherein the ratio adjusting means includes means for dividing the RF frequency in a first divider by a first divisor M to obtain the divided-down carrier frequency cycles to be used to generate the first and second signals.

18. The apparatus of claim 17, wherein the ratio adjusting means includes means for programmably dividing the output of the first divider by a selected divisor Q.

19. The apparatus of claim 18, wherein the ratio adjusting means further includes means for dividing the programmably-divided frequency by a second divisor N to obtain a first signal with a frequency approximately equal to the frequency of the synchronization pulses.

20. The apparatus of claim 11, including means for separately counting a selected number R of divided-down carrier frequency cycles after each synchronization pulse, before enabling the second sweep waveform sampling signal.

* * * * *